Patented Apr. 21, 1936

2,038,160

UNITED STATES PATENT OFFICE 2,038,160

UNDER WATER CEMENT AND MORTAR

Howard J. Billings, South Acton, Mass., assignor to Arthur D. Little, Incorporated, Cambridge, Mass., a corporation of Massachusetts No Drawing. Application May 3, 1932, Serial No. 609,039

4 Claims. (Cl. 106—35)

This invention relates to a cement, and to a concrete and a mortar, especially adapted for under water work.

A mortar made in the usual manner of Portland cement and sand or other filler cannot be manipulated under water in a satisfactory manner, as the water currents, even those set up by the hand or tool of the worker, wash away the cement, and the filler, before the cement has time to set. There may be some conditions where an ordinary cement mortar can be used under water such, for instance, as where the mortar is not worked or molded, or is protected by forms or otherwise from the dispersion effects of the water currents. In general, however, where a surface of the mortar is unsupported or is exposed to the moving water, or the mortar has to be worked into shape, or in crevices, the usual cement mortar will be washed away before it has had time to set.

I have discovered, however, that a highly satisfactory cement and a mortar for under water work, and one that is not washed away by currents of the water in which it is submerged, can be made by incorporating a suitable water-insoluble binder with a hydraulic cement such as Portland cement and particularly with a hydraulic cement having a characteristic presently to be described. The binder forms with the cement or the mortar an integral mass in which the cement and any filler are held against dispersion when under water and the mass can be worked like putty into any desirable configuration. The consistency of the mass can be varied to adapt it for any specific use by varying the amount of water that is added to the mortar in the cement mixer and the binder holds the elements of the mortar together without any harmful dispersion thereof when subjected to strong currents of water during the time required for the cement to set.

I have tried a number of binders, such as a water-insoluble gelatine, casein and bentonite. While all these binders gave satisfactory results in preventing attrition of the mortar when subjected to a moving body of water, the material the most satisfactory in many respects was found to be bentonite, sometimes known as wilkinite, a particular type of clay that is considerably more finely divided than cement.

In making an under water cement composition in accordance with my invention, the bentonite is mixed with the cement in such a manner that a thorough dispersion of the bentonite throughout the cement is obtained. This result can be obtained by thoroughly agitating the mixture of cement and bentonite or by grinding them together in a mill. For a concrete that has marked resistance against attrition by water currents as well as satisfactory strength, I employ preferably a quantity of bentonite about equal to twelve per cent of the weight of cement.

The cementitious mixture is made into a mortar by the addition of water and any usual filler, as sand, in the usual manner. The mortar, however, instead of being an agglomeration of discrete, readily dispersible particles, as the usual Portland cement mortar, comprises an adherent mass, resembling a mass of putty, wherein the particles are bonded or are held together by the action of the bentonite binder. The stiffness of the mass can be modified by adding more or less water but under all conditions where the mass is suitable for making a strong concrete, the binder holds the parts against dispersion.

Bentonite has the property of swelling upon absorption of water and, in making a mortar with bentonite, I cause the bentonite to absorb water and swell as the binding property of bentonite appears to have a direct bearing upon the amount of swelling of the bentonite. Unswollen bentonite has no particular binding property, at least for the present invention.

The mortar thus constituted is not dispersed or worn away to any harmful extent before the cement sets even when subjected to strong currents of the water in which it is submerged.

The proportions of bentonite can be varied within certain limits. However, if the proportion of bentonite is below about seven per cent there is poor bonding action and the mortar, before it sets, can be readily attrited by water currents. If the amount of bentonite is increased above about fifteen per cent, the strength of the concrete begins to fall off too much for use where strength is important. If concrete strength is unimportant, the amount of bentonite can be increased if some peculiar condition indicates such increase although ordinarily, there is no need for such increase. With the proportions of bentonite preferred, namely twelve per cent, the strength of the concrete is about half what it would be if the bentonite were eliminated. The reduction in strength of the concrete appears to be some measure of the bonding action of the bentonite.

It has been found that, while the strength of my bentonite-cement composition is reduced by the bentonite, which reduction is not ordinarily harmful in under water work, the cement composition has a considerably stronger adherency to stone work and previously laid cement. This is important as cement, under water, is used largely to hold together masonry structures as stone walls, abutments and the like.

Some hydraulic cements have a low and others a high alumina content. I have discovered that that the binding ability of the bentonite to resist attrition of the mortar by water currents is remarkably increased, without any noticeable increase in the consistency of the mortar, if the bentonite is used with a hydraulic cement having a high alumina content; and the results are so much superior that, in commercial practice, I prefer to employ the combination of bentonite and a high alumina cement in which, for instance, the alumina is, say, about forty per cent of the total. In experiments performed upon two similar mortar bodies, both containing the same percentages of cement, bentonite and a filler, and both subjected to the same water currents, but one having a high and the other a low alumina content, the mortar body having cement of high alumina content set without any perceptible attrition of the surface thereof, the body even retaining the slight marks of the tool made in forming it. On the other hand, the body having cement of low alumina content showed signs of surface attrition at the end of the same time. The attrition was in no way so serious as to render the mortar unusable for under water work but, nevertheless, indicated the inferiority of the cement to one having a high alumina content.

While I prefer to incorporate the bentonite, or other binder, in the cementitious composition in dry form, as above described, nevertheless I can introduce the binder in the water, or part of the water, that is used in making the mortar.

I claim:

1. An underwater cement composition comprising an intimate mixture of hydraulic cement of high alumina content and a water-insoluble binder comprising bentonite, both being in finely divided solid form, the solid particles of the binder in the presence of the water which is added to the composition in making a mortar forming with the cement, and any filler that may be present in the mortar, an adherent moldable mass the particles of which are so strongly bonded together as to resist harmful attrition by the currents of water in which the mass is submerged, during the time required for the cement to set, the bentonite content of the cement being greater than seven per cent and less than fifteen percent thereof.

2. An underwater mortar comprising cement of high alumina content, a filler, and bentonite in at least a partially swollen state forming with said cement and filler a viscous moldable mass resistant to harmful attrition by the currents of water in which the mass is submerged during the time required for the mortar to set, the bentonite content of the cement being greater than seven per cent and less than fifteen per cent thereof.

3. An underwater cement composition comprising an intimate mixture of hydraulic cement of high alumina content and a water-insoluble binder comprising bentonite, both being in finely divided solid form, the solid particles of the binder in the presence of the water which is added to the composition in making a mortar forming with the cement, and any filler that may be present in the mortar, an adherent moldable mass the particles of which are so strongly bonded together as to resist harmful attrition by the currents of water in which the mass is submerged, during the time required for the cement to set, the bentonite content being approximately twelve per cent of the cement.

4. An underwater mortar comprising cement of high alumina content, a filler, and bentonite in at least a partially swollen state forming with said cement and filler a viscous moldable mass resistant to harmful attrition by the currents of water in which the mass is submerged during the time required for the mortar to set, the bentonite content being approximately twelve per cent of the cement.

HOWARD J. BILLINGS.